United States Patent [19]

Bindon

[11] 3,731,770

[45] May 8, 1973

[54] ADJUSTABLE SHOCK ABSORBER

[75] Inventor: Glyn A. Bindon, Oxford, Mich.

[73] Assignee: Ace Controls, Inc., Farmington, Mich.

[22] Filed: May 19, 1971

[21] Appl. No.: 144,894

[52] U.S. Cl. .................188/285, 188/287, 188/318, 213/43
[51] Int. Cl. ................................................F16f 9/44
[58] Field of Search......................188/282, 284, 285, 188/287, 289, 314, 315, 317, 299, 313, 319, 318; 213/43, 8

[56] References Cited

UNITED STATES PATENTS

| 3,168,168 | 2/1965 | Chorkey | 188/287 |
| 3,341,189 | 9/1967 | Rumsey | 188/314 X |
| 3,344,894 | 10/1967 | Kenworthy | 188/287 |
| 3,446,317 | 5/1969 | Gryglas | 188/287 |
| 3,605,960 | 9/1971 | Singer | 188/314 |

FOREIGN PATENTS OR APPLICATIONS

| 315,917 | 7/1929 | Great Britain | 188/289 |

*Primary Examiner*—George E. A. Halvosa
*Attorney*—Donnelly, Mentag & Harrington

[57] ABSTRACT

An adjustable hydraulic shock absorber having a shock receiving piston means telescopically mounted over an axially disposed fluid metering tube means provided with a plurality of metering orifices, and means for adjusting the effective cross sectional areas of the metering orifices.

23 Claims, 31 Drawing Figures

Patented May 8, 1973

INVENTOR
GLYN A. BINDON

BY
Donnelly, Mentag & Herrington

ATTORNEYS

Patented May 8, 1973
3,731,770
8 Sheets-Sheet 3
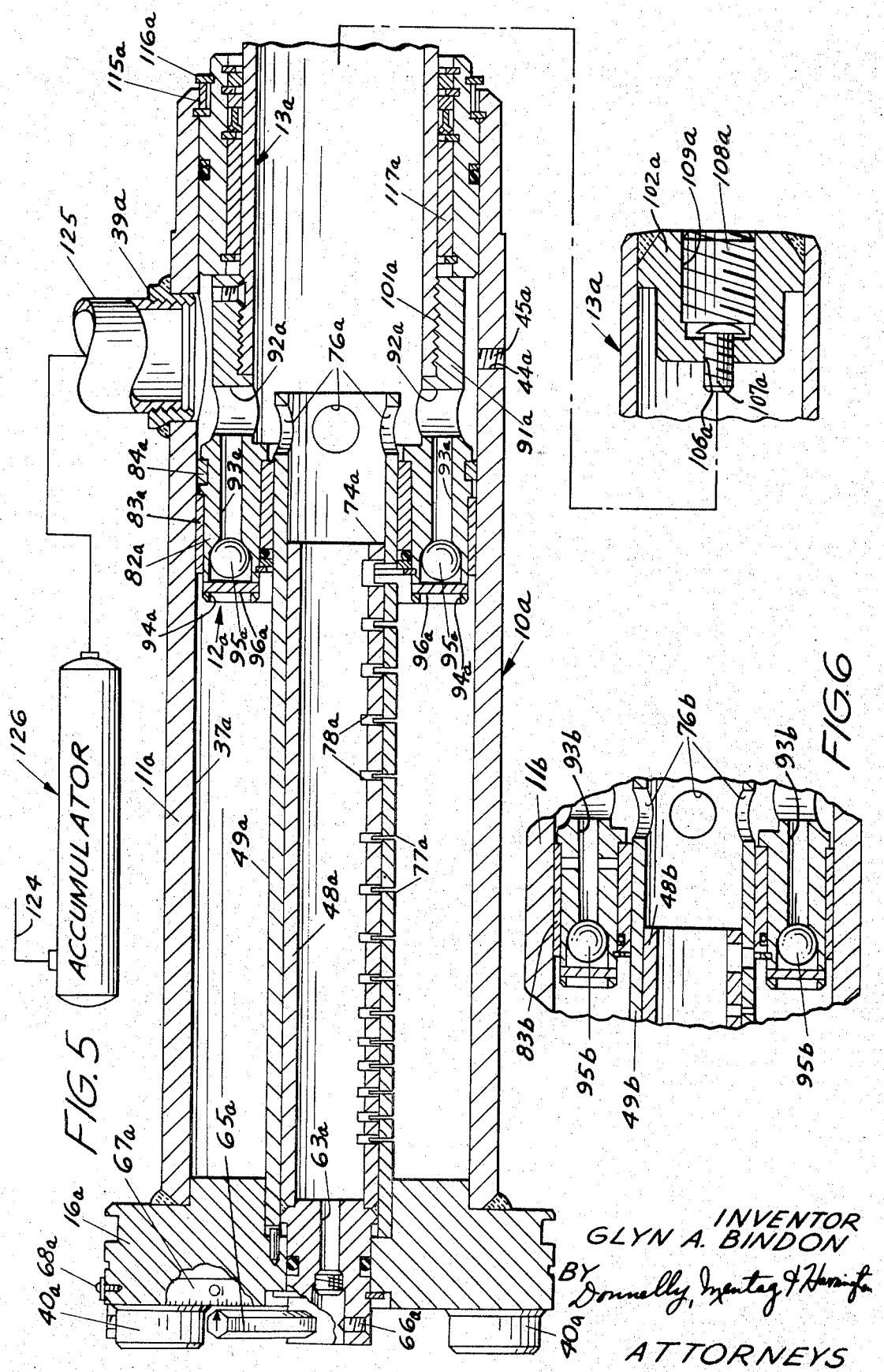
INVENTOR
GLYN A. BINDON
BY Donnelly, Mentag & Harrington
ATTORNEYS Patented May 8, 1973

INVENTOR.
GLYN A. BINDON
BY
Donnelly, Mentag & Harrington
ATTORNEYS

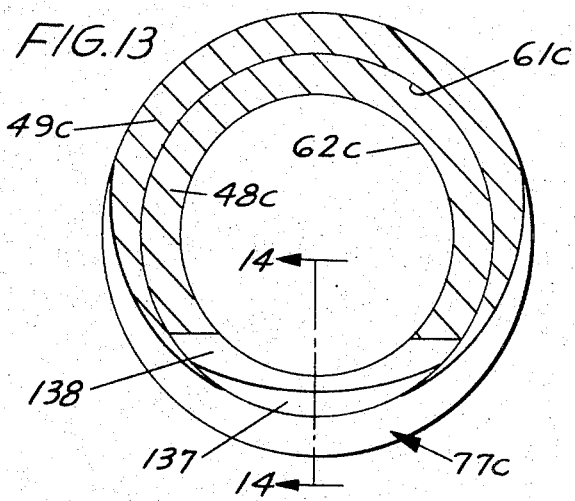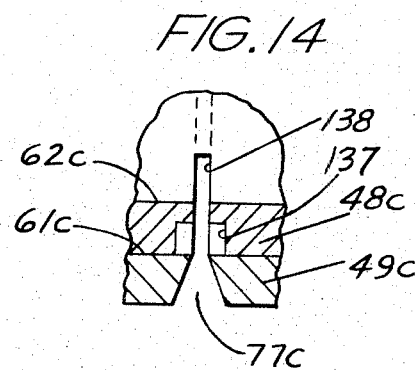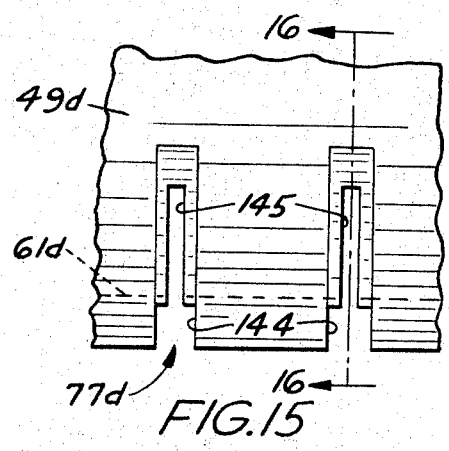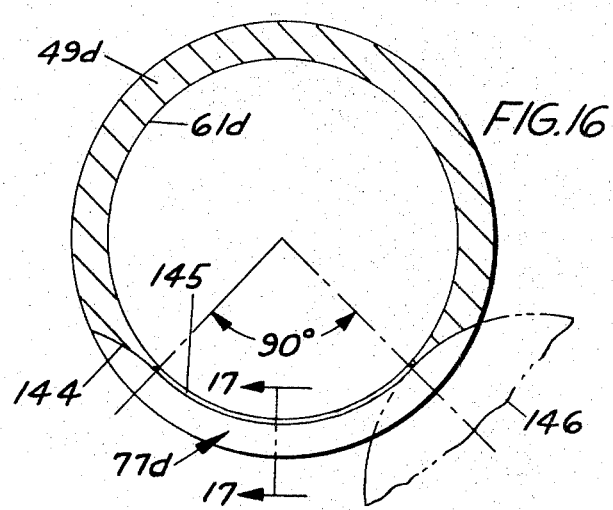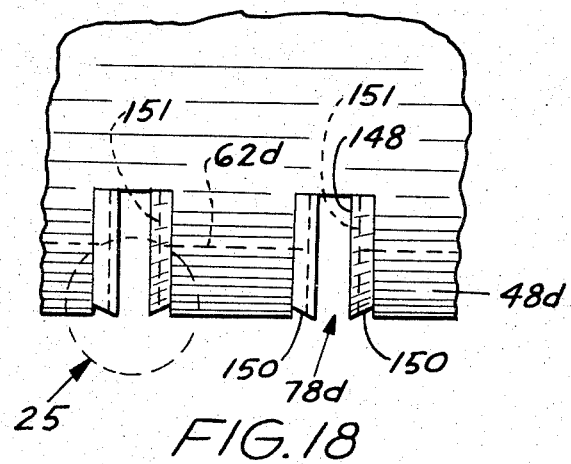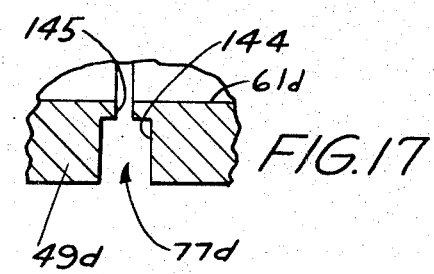
INVENTOR.
GLYN A. BINDON
BY Donnelly, Meutag & Harrington
ATTORNEYS INVENTOR.
GLYN A. BINDON
BY
Donnelly, Mentag & Harrington
ATTORNEYS INVENTOR.
GLYN A. BINDON
BY Donnelly, Mentag & Harrington
ATTORNEYS Patented May 8, 1973

INVENTOR.
GLYN A. BINDON
BY
Donnelly, Mentag & Harrington
ATTORNEYS

ADJUSTABLE SHOCK ABSORBER

SUMMARY OF THE INVENTION

This invention relates to the adjustable hydraulic shock absorber art, and more particularly, to an adjustable hydraulic shock absorber having the shock receiving piston means telescopically mounted over an axially disposed adjustable metering tube means.

It is an important object of the present invention to provide an economical adjustable hydraulic shock absorber which is provided with an efficient adjustment means that provides a wide range of metering orifice adjustment with a maximum degree of insensitivity to temperature fluctuations.

It is another object of the present invention to provide an adjustable hydraulic shock absorber which may be quickly and easily modified for special shock absorbing conditions and for optional type of mountings.

It is still another object of the present invention to provide an adjustable shock absorber which is provided with a metering tube means having about one-third of the diameter of the prior art metering tubes used in adjustable shock absorbers so as to provide a metering tube structure which may be more economically manufactured because of the minimum amount of surface area which must be accurately finished. The structure of the shock absorber of the present invention permits the ratio of tube wall thickness to tube diameter to be increased because the tubes are relatively stiffer. The increased stiffness decreases the likeliness of the tubes going out of round, which means that they can be more easily finished to closer mating tolerances. The same stiffness in a large diameter tube would result in excessive material cost and greater bulk and weight in the final product.

It is still another object of the present invention to provide an adjustable hydraulic shock absorber having a more simple piston cylinder which is provided with a smooth and uninterrupted main bore so as to provide greater structural integrity and eliminate sharp edged orifices and thus provide longer piston life.

It is still a further object of the present invention to provide a small diameter metering tube means which includes a pair of relatively rotatable tubes for varying the metering orifice size and which provides an optimum valving means since there are no large hydraulic forces tending to separate the edges of the metering orifices. The reduced diameter tube-on-tube metering means provides an advantage of reduced temperature sensitivity.

It is still a further object of the present invention to provide an adjustable hydraulic shock absorber having a metering tube means provided with a plurality of metering orifices having sharp edges which are relatively insensitive to oil viscosity changes as a result of temperature changes.

It is still a further object of the present invention to provide an adjustable hydraulic shock absorber provided with a small diameter metering tube means which permits the increasing of orifice slot widths as compared to the prior art large diameter metering tube means. The ability to provide increased orifice slot widths provides an orifice construction wherein the viscous pressure drop is substantially reduced as compared to larger diameter shock absorbers where large diameter metering tubes are employed. This improved structure provides a shock absorber which will operate as rapidly and efficiently when it is first started at the beginning of a work day as when it is used on an assembly line after a full day's use. The small diameter metering tube structure of the present invention also permits the use of a large number of adjustable orifices without weakening the metering tubes to provide optimum efficiency.

It is still a further object of the present invention to provide a small diameter metering tube means for an adjustable hydraulic shock absorber wherein the metering tubes are fitted together with close tolerances so as to hold leakage between the two to a minimum and thus provide a shock absorber which is capable of providing linear deceleration at extremely slow speeds.

It is still another object of the present invention to provide an adjustable shock absorber which includes a piston cylinder having one end enclosed by a cylinder head and having port means at the other end connected to a fluid accumulator means, a fluid metering tube means supported axially in the piston cylinder and provided with a plurality of fluid metering orifices and means for adjusting the cross sectional sides of the orifices, a shock absorbing piston means slidably mounted in the piston cylinder and being telescopically mounted over the metering tube means, said piston cylinder and metering tube means being filled with fluid, and a first fluid passage means for connecting the interior of the metering tube means to said port means during a shock absorbing operation and a second fluid passage means connecting the port means to the piston cylinder means during an outward movement of the piston means.

Other features and advantages of this invention will be apparent from the following detailed description, appended claims, and the accompanying drawings.

BRIEF DESCRIPTION OF THE DRAWINGS

FIG. 5 is a broken, longitudinal section view of a second embodiment of the invention, and showing an accumulator return means.

FIG. 6 is a fragmentary, elevational section view of a modified piston rod combination bearing and seal means adapted to be employed in the shock absorber embodiments illustrated in FIGS. 1 and 5.

FIG. 13 is an elevational section view of the inner metering tube structure of FIG. 11 rotatably mounted inside of the outer fixed metering tube structure of FIG. 7, and showing the inner metering tube in a fully open position.

FIG. 14 is an enlarged, fragmentary, elevational section view of the structure illustrated in FIG. 13, taken along the line 14—14 thereof, and looking in the direction of the arrows.

FIG. 15 is a fragmentary side elevational view of another outer fixed metering tube adapted to be used in the shock absorber of the present invention, and showing a further type of sharp edged metering orifice.

FIG. 16 is an elevational section view of the outer metering tube structure illustrated in FIG. 15, taken along the line 16—16 thereof, and looking in the direction of the arrows.

FIG. 17 is a fragmentary, enlarged, elevational section view of the structure illustrated in FIG. 16, taken along the line 17—17 thereof, and looking in the direction of the arrows.

FIG. 18 is a fragmentary side elevational view of an adjustable inner metering tube adapted to be used with the outer fixed metering tube illustrated in FIGS. 15 through 17.

DESCRIPTION OF THE PREFERRED EMBODIMENTS

Figure 1:
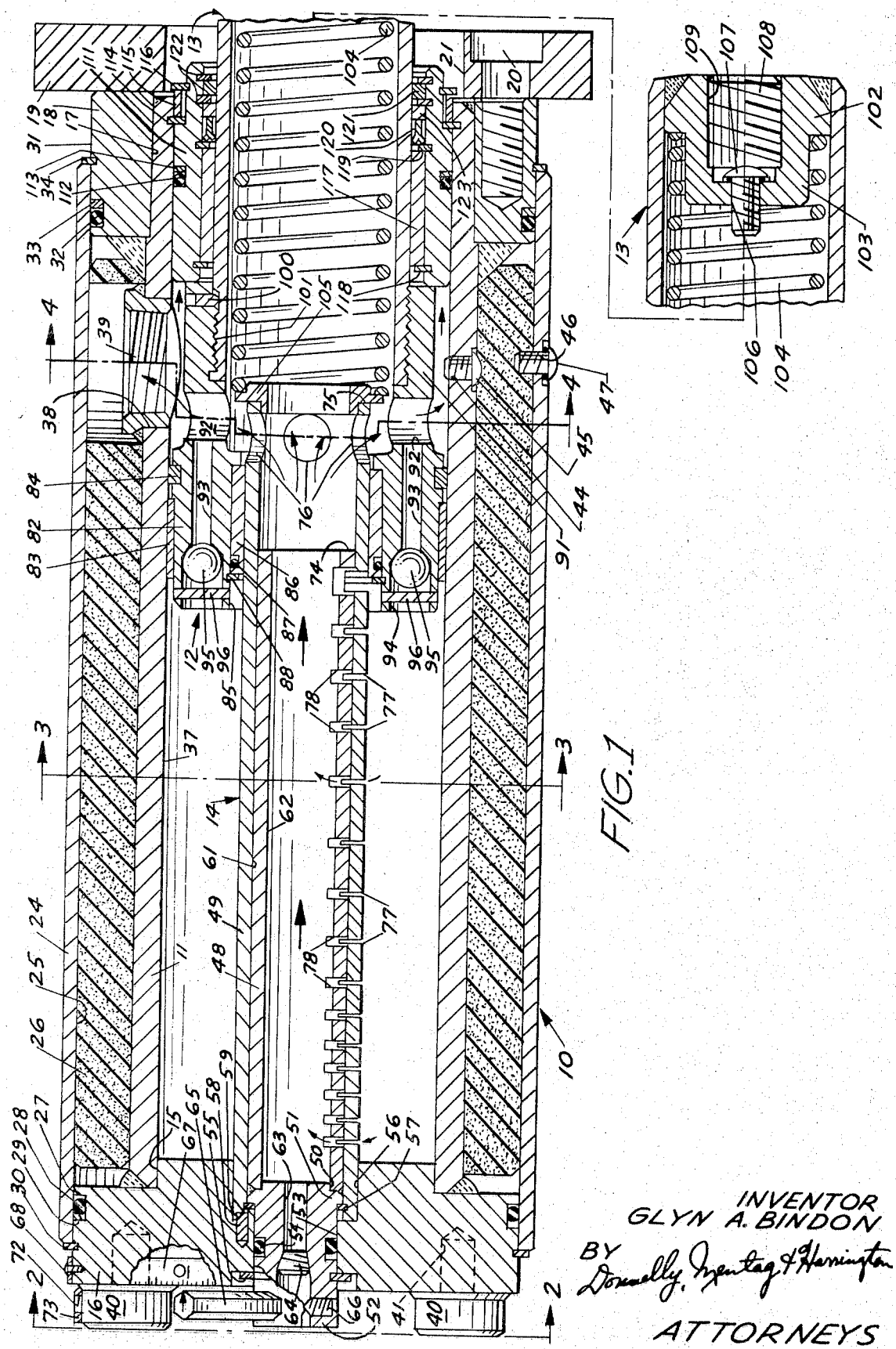
FIG. 1 is a broken, longitudinal section view, with parts broken away, of an illustrative shock absorber made in accordance with the principles of the present invention.

Referring now to the drawings, and in particular to FIG. 1, wherein is shown an illustrative embodiment of the invention, the numeral 10 generally designates a shock absorber made in accordance with the principles of the present invention. The shock absorber 10 includes an outer piston cylinder or tube 11 in which is slidably mounted a shock absorber piston assembly generally indicated by the numeral 12 and which carries on its outer end a hollow or tubular piston rod 13. The numeral 14 generally designates a tubular metering means which is fixedly mounted in the outer tube 11 in a central longitudinal position, and over which is telescopically and slidably mounted the piston assembly 12 and the tubular piston rod 13.

As shown in FIG. 1, the rear end of the outer tube 11 is mounted around a shoulder 15 that is formed on a rear cylinder head 16 that functions as an outer tube retainer. The outer tube 11 is fixedly secured to the rear cylinder head 16 by any suitable means, as by welding. The front end of the outer tube 11 is mounted in a bore 17 in a front mounting ring 18. The outer tube 11 may be secured to the front mounting ring 18 by any suitable means, as by welding. The shock absorber 10 may be front mounted or rear mounted, as desired. As shown in FIG. 1, a front mounting plate 19 is releasably secured to the mounting ring 18 by a plurality of suitable machine screws 20. The front mounting plate 19 is provided with an axial bore 21 through which passes the tubular piston rod 13.

Figure 3:
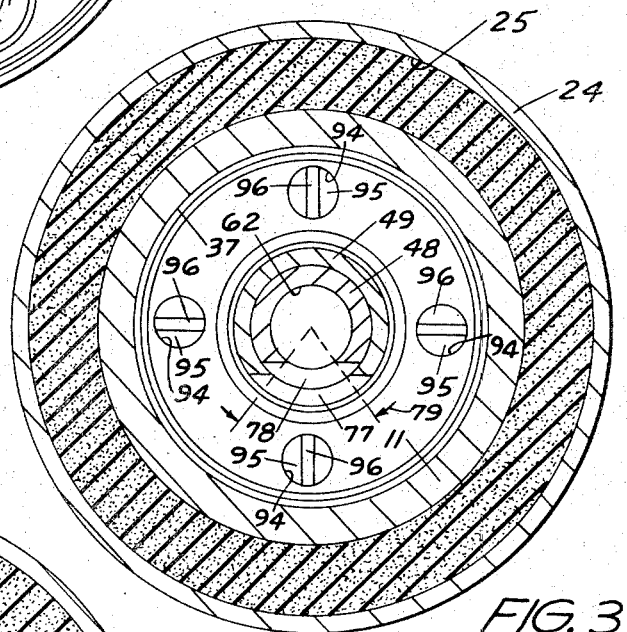
FIG. 3 is an elevational section view of the structure illustrated in FIG. 1, taken along the line 3—3 thereof, looking in the direction of the arrows, and showing the adjustable inner metering tube in the fully open position.

As shown in FIGS. 1 and 3, an accumulator cylinder or tube 24 is concentrically mounted around the outer tube 11 and has its rear end slidably mounted over the outer periphery 27 of the cylindrical rear cylinder head 16, and has its front end slidably mounted over the outer periphery 31 of the front mounting ring 18. The annular space 25 between the outer tube 11 and the accumulator tube 24 comprises an accumulator chamber in which is mounted a suitable cylindrical accumulator sponge 26. The sponge 26 may be formed from any suitable material as for example, it may be made from a closed cell cellular rubber material.

As shown in FIG. 1, a suitable sealing means is provided between the periphery 27 of the rear cylinder head 16 and the accumulator tube 24 in the form of a suitable O-ring 28 and a back-up ring 29. A releasable retaining ring 30 is mounted around and in the rear cylinder head 16, and it abuts the rear end of the accumulator tube 24. An O-ring seal 32 and a back-up ring 33 are also disposed in the periphery of the front mounting ring 18 for sealing engagement with the inner surface of the accumulator tube 24. A releasable retaining ring 34 is operatively mounted in the outer periphery of the mounting ring 18 and abuts the front end of the accumulator tube 24. It will be seen that the retainer rings 30 and 34 retain the accumulator tube 24 against axial movement.

Figure 4:
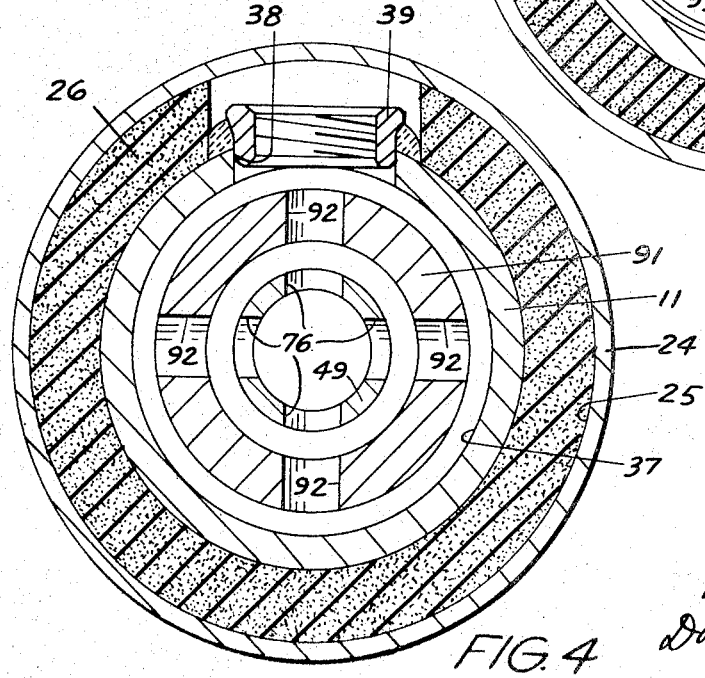
FIG. 4 is an elevational section view of the structure illustrated in FIG. 1, taken along the line 4—4 thereof, and looking in the direction of the arrows.

As shown in FIGS. 1 and 4, the piston chamber or cylinder 37, inside the outer tube 11, is in communication with the accumulator chamber 25 through an insert port 39. The port 39 is threadably mounted in a bore 38, which is formed in the wall of the outer tube 11 adjacent the front end of the shock absorber 10, but it will be understood that it may be secured in place by any other suitable means, as by welding.

Figure 2:
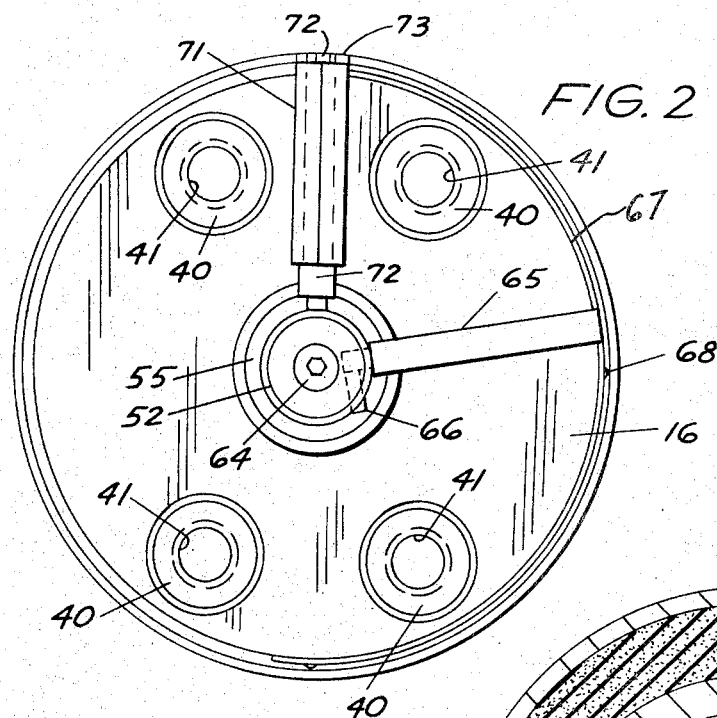
FIG. 2 is a left hand view of the structure illustrated in FIG. 1, taken along the line 2—2 thereof, looking in the direction of the arrows, and showing the adjusting pin for the inner metering tube moved to a 30° adjustment position.

As shown in FIGS. 1 and 2, the rear cylinder head 16 carries a plurality of outwardly extended mounting lugs 40 which are each provided with a threaded axial bore 41 that extends inwardly into the cylinder head 16. The lugs 40 thus provide a means for mounting the shock absorber 10 at the rear end thereof to a suitable mounting flange or other member.

As shown in FIG. 1, the outer tube 11 and the accumulator tube 24 are each provided with a bleed hole as 44 and 46, respectively, which are each adapted to be closed by a suitable bleed screw as 45 and 47, respectively.

As shown in FIGS. 1 and 3, the tubular metering means 14 comprises a pair of concentrically mounted metering tubes comprising a rotatably adjustable inner metering tube 48 and a fixed outer metering tube 49. As shown in FIG. 1, the rear end of the inner metering tube 48 is mounted over an axially inward extended shoulder 50 which is formed on the inner side of an inner tube retainer 52. The inner tube retainer 52 is made in the form of a substantially cylindrical plug which is rotatably mounted in a central longitudinal bore 53 formed through the cylinder head 16 and having a stepped, enlarged inner end bore 56. The rear end of the inner metering tube 48 sits against an enlarged radial flange 51 formed on the inner end of the inner tube retainer 52, and it is secured thereto by any suitable means, as by welding. A suitable combination O-ring and back-up ring sealing means, indicated by the numeral 54, is operatively mounted around the inner tube retainer 52 for sealing engagement with the bore 53. The inner tube retainer 52 is releasably secured in the rear cylinder head bore 53 by a releasable retainer ring 55.

As shown in FIG. 1, the rear end of the fixed outer metering tube 49 is slidably mounted in the enlarged stepped inner end 56 of the axial bore 53, and in a rotatable sliding engagement with the enlarged radial flange 51 on the retainer 52.

The outer metering tube 49 is fixed against longitudinal movement by a releasable retaining ring 57 and against rotatable movement by an axially disposed dowel pin 58. The dowel pin 58 is positioned in an axial hole in the cylinder head 16, as by press fit, and the outer end thereof extends into a dowel pin hole 59 formed in the rear end of the wall of the outer metering tube 49.

The bore or interior chamber in the outer metering tube 49 is indicated by the numeral 61 and the bore or interior chamber in the inner metering tube 48 is indicated by the numeral 62. The inner tube chamber 62 communicates at its rear end with an axial bore 63 formed through the inner tube retainer or plug 52. The outer end of the axial bore 63 is closed by a threadably mounted plug 64.

As shown in FIGS. 1 and 2, the retainer or plug 52 is adapted to be rotated, so as to adjust the inner metering tube 48 between open and closed positions, by an adjusting pin 65, which is fixedly secured in the inner tube retainer 52 by a set screw 66. The adjusting pin 65 is adapted to be moved through a 90° arc so as to rotate and adjust the inner metering tube 48 between fully closed and fully opened positions. In order to indicate the adjusted setting of the inner tube 48, the upper end of the adjusting pin 65 is provided with an indicating arrow as shown in FIG. 1. The arrow on the adjusting pin 65 would be positioned opposite the desired angle setting, as indicated by suitable angle indicia on a graduated dial 67 which is secured to the periphery of the rear cylinder head 16 by any suitable means, as by a plurality of screws 68.

As shown in FIG. 2, the inner tube retainer or plug 52 is adapted to be secured in an adjusted position by a lock screw 72 which is threadably mounted in a radially disposed tubular body 71 that is fixedly secured by any suitable means, as by welding, to the outer face of the rear cylinder head 16. The inner end of the lock screw 72 is adapted to engage the outer periphery of the retainer 52 and hold it in an adjusted position. The lock screw 72 is adapted to be secured in a locking position by means of a lock screw retainer nut 73.

As shown in FIG. 1, the front end of the inner adjustable metering tube 48 is indicated by the numeral 74 and it terminates short of the front end 75 of the outer fixed metering tube 49. As shown in FIGS. 1 and 4, a plurality of four ports 76 is formed through the front end of the outer fixed metering tube 49 in a position forward from the front end 74 of the inner adjustable metering tube 48.

As shown in FIGS. 1 and 3, the fixed outer metering tube 49 is provided with a plurality of longitudinally spaced apart, sharp edged metering orifices 77 which are aligned with a similar plurality of sharp edged metering orifices 78 formed through the wall of the adjustable inner metering tube 48 in longitudinally spaced positions.

It will be seen that by adjusting the inner metering tube 48 relative to the fixed outer metering tube 49, the operative metering orifice cross section area between the interior 37 of the outer tube 11 and the interior 61 of the inner metering tube 48 will be adjusted, as desired, and in accordance with the load to be absorbed by the shock absorber 10. It will be understood that the orifices 77 and 78 are longitudinally spaced in their respective metering tubes so as to provide a linear deceleration and maintain a constant retarding force. The metering orifices 77 and 78 are spaced apart exponentially and this type of spacing is well known in the shock absorber art.

The orifices 77 and 78 may be provided with various cross-sectional areas, in order to provide a desired type of shock absorbing effect throughout the operating stroke of the shock absorber.

As shown in FIG. 3, the orifices 77 and 78 are shown as having an operative arcuate length of 90°, as indicated by the numeral 79. The orifices 77 and 78 will be seen from an inspection of FIGS. 1 and 3 to be grooves in the form of slots which are milled into the peripheries of the tubes 48 and 49, and they are positioned so as to be aligned with each other when the adjusting pin 65 is in the 90° operative position so as to provide a fully opened position. When the adjusting pin 65 is moved counterclockwise, as viewed in FIG. 2, to the zero position, the orifices 78 in the inner metering tube 48 will be moved counterclockwise of the position shown in FIG. 3 so as to be disposed 90° adjusted from the position of FIG. 3 and to have the closed wall of the inner tube 48 cover the orifices 77 in the fixed outer tube 49 and close off flow through the orifices. As viewed in FIG. 3, the adjusting pin 65 has been moved to a position of about 85°. In the position shown in FIG. 1, the adjusting pin 65 is at an open position of about 10°.

In FIG. 1, the numeral 82 designates a shock absorber piston which is provided with an annular sleeve bearing 83 on its head outer diameter and which is in sliding engagement with the wall of the inner tube chamber 37. The piston 82 is also provided around its head with a suitable piston ring 84. The piston 82 is provided with a central longitudinal bore 85 which extends completely therethrough and in which is received the front ends of the metering tubes 48 and 49. A suitable sleeve bearing 86 is fixedly mounted on the piston 82 in the bore 85 for sliding engagement with the outer surface of the cylindrical fixed outer metering tube 49. A suitable combination O-ring and back-up ring sealing means 87 is mounted on the outer end of the bearing 86 in sealing engagement with the piston bore 85 and it is secured in place by a releasable retainer ring 88 that also functions to hold the bearing 86 in a fixed axial working position in the piston bore 85.

As shown in FIG. 1, the outer end of the piston 82 is reduced in cross-sectional size to provide a reduced diameter outer end portion 91 having a plurality of radially extended and circumferentially spaced fluid bores or passageways 92. The passageways 92 communicate with the ports 76 which are formed through the fixed outer metering tube 49. The space between the reduced diameter piston outer end portion 91 and the inner surface of the outer tube 11 forms a passageway to permit passage of fluid from the bores 92 to the port 39 mounted in the wall of the outer tube 11 and thence to the accumulator chamber 25, as explained more fully hereinafter.

As shown in FIG. 1, the piston 82 is provided with a plurality of longitudinally extended bores or passages 93 which each extend rearwardly from one of the radially extended passages 92. The rear end portion of each of the passages 93 is enlarged, as indicated by the numeral 94. A ball check valve 95 is operatively mounted in each of the enlarged bore portions 94, and it is adapted to be moved by fluid pressure between a valve seat formed on the end of the bore 93 where it meets the enlarged bore portion 94 and a transverse retaining pin 96. Each of the retaining pins 96 is fixedly mounted in the piston at a point spaced apart rearwardly from each of the ball check valve seats so as to permit the respective ball check valve 95 to be moved off of the ball check valve seat under certain fluid flow conditions, and yet be retained in the respective enlarged bore portion 94, as explained more fully hereinafter. As shown in FIG. 3, there are four of the aforementioned enlarged bore portions 94 in which are seated the ball check valves 95.

As shown in FIG. 1, the inner end of the tubular piston rod 13 is threadably mounted in a threaded bore 101 in the piston 82. The piston rod 13 is secured in place in the bore 101 by any suitable means, as by a set screw 100. As shown in FIG. 3, the outer shock absorbing end of the piston rod 13 is enclosed by a suitable end plug 102 which is fixed in place by any suitable means, as by welding. The end plug 102 is provided with the reduced inner end 103 around which is positioned the outer end of a suitable return spring 104. The inner end of the return spring 104 is operatively seated on a spring retainer collar 105 which is operatively mounted on the front end of the fixed outer metering tube 49.

The rod end plug 102 is provided with a bleed hole 106 and a bleed screw 107 for bleeding the interior of the tubular piston rod 13. Bleed hole 106 communicates with a stepped, enlarged bore 109 in which is threadably mounted a plug 108. In lieu of the plug 108, a suitable steel cap or button may be secured to the piston rod 13 by a bolt threaded into the bore 109.

As shown in FIG. 1, a suitable cylindrical gland retainer 111 is fixedly mounted in the outer end of the outer tube 11 and it limits the outward movement of the piston 82 and the rod 13. A suitable O-ring 112 with a back-up ring 113 is operatively mounted in the outer periphery of the gland retainer 111 for sealing engagement with the outer tube 11. The gland retainer 111 is retained in an axial position in the outer tube 11 by means of a pair of retainer rings 114 and 116 which are spaced apart by a retainer tube 115. It will be seen that the retainer ring 114 is mounted in a suitable groove in the outer tube 11 and the retainer ring 116 is mounted in a suitable groove in the gland retainer 111.

A piston rod sleeve bearing 117 is supported on the gland retainer 111 by a pair of retainer rings 118 and 119. The retainer rings 118 and 119 are mounted in suitable grooves in the inner periphery of the gland retainer 111 and they hold the bearing 117 against axial movement. A suitable seal 120 in the form of a U-shaped cup seal, is operatively mounted on the outer side of the retainer ring 119 and it is held in axial position by a seal retainer ring 123 and a first retainer ring 122. A wiper ring 121 is mounted on the outer side of said first mentioned retainer ring 122 and it is held in position by a second retainer ring 122. The retainer rings 122 are mounted in suitable grooves in the inner periphery of the retainer gland 111.

The operation of the adjustable hydraulic shock absorber of the present invention will be obvious from the aforegoing description. However, the following resume will also be given. The shock absorber 10 would be mounted in an operative supporting structure with the piston rod 13 in the extended position shown in FIG. 1 for the reception of a load. The accumulator chamber 25, the chamber 37 in the outer tube 11, the chamber 62 in the inner metering tube 48, and the interior of the tubular piston rod 13, would be filled with a suitable pressurized hydraulic fluid. The fluid would be selectively admitted through one of the bleed holes 44, 46 or 106. The bleed screws 47 and 107 are used to bleed off any air in the system. The adjusting pin 65 is then turned to the proper setting for the load which is to be absorbed. On the application of a load, or a weight impacting on the outer end of the tubular piston rod 13, the rod 13 and the piston 82 start moving inwardly, or to the left as viewed in FIG. 1, and the piston 82 forces the hydraulic fluid or oil from the chamber 37 in the outer tube 11 through the metering orifices 77 and on through the metering orifices 78 into the passage or chamber 62 in the inner metering tube 48. The fluid is then forced to the right, as viewed in FIG. 1, and out through the ports 76 and thence through the passages 92 and out through the port 39 into the accumulator chamber 25. The hydraulic fluid entering the accumulator chamber 25 is under pressure and compresses the closed cellular rubber accumulator sponge 26. The resistance to fluid flow through the metering orifices 77 and 78 governs the shock absorber's internal pressure which in turn sets up resisting forces to stop the load or weight impacting on the piston rod 13. A controlled deceleration, and soft and smooth stopping of the load is accomplished because the kinetic energy of the moving piston rod 13 and piston 82 is absorbed throughout the length of stroke of the piston 82, and it approaches zero at the end of the stroke due to the longitudinal spacing of the metering orifices.

It will be seen that the metering orifices 78 in the adjustable tube 48 are formed with a larger width than the orifices 77 and that they are extended throughout an arc of 90°. As shown in FIG. 3, when the inner tube 48 is rotated to the 90° open position the arcuate orifices 77 and 78 are aligned so as to permit full flow of hydraulic fluid therethrough. As the adjusting pin 65 is moved from the zero position, the effective cross sectional area of each of the metering orifices or slots 77 is reduced to provide a controlled velocity at which the fluid will be discharged from the outer tube chamber 37 into the inner metering tube 48 to control the deceleration of the load.

It will be seen that on the movement of the piston 82 inwardly, the accumulator sponge 26 is compressed by the incompressible hydraulic fluid, and that on the return stroke upon removal of the load the return spring 104 returns the piston 82 and the piston rod 13 to the initial position. During the return stroke the ball check valves 95 are moved to the left, as viewed in FIG. 1, against the retainer pins 96 so as to allow the hydraulic fluid to pass from the accumulator chamber 25 and through the port 39, the passages 92 and 93, and out through the passages 94 into the chamber 37 in the outer tube 11 to again put the shock absorber 10 in a shock absorbing condition. The cellular accumulator sponge 26 expands back to its original shape. It will be understood that the shock absorber 10 is adapted to be precalibrated for known loads or weights so that the adjusting pin 65 may be set relative to the indicia on the graduated dial 67 for various loads.

It will also be understood that the widths of the orifices 77 and 78 would be made in accordance with the desired velocities for controlling the deceleration of loads in accordance with the capacity to which the shock absorber is to be designed.

The adjustable shock absorber of the present invention provides a less expensive and more efficient adjustment means when compared with the prior art adjustable shock absorbers. It also yields a wider range of adjustment with a greater degree of insensitivity to temperature fluctuations than the prior art adjustable shock absorbers. It is also adapted to be easily modified to special conditions and optional mountings. The diameter of the metering tubes of the shock absorber of the present invention is about one-third of the diameter of the metering tubes used in the prior art adjustable shock absorbers, and this structure results in manufacturing economy because the smaller diameter metering tubes have only one-third of the surface area which must be accurately finished as compared to the prior art structures. The structure of the shock absorber of the present invention permits the ratio of tube wall thickness to tube diameter to be increased because the tubes are relatively stiffer. The increased stiffness decreases the likeliness of the tubes going out of round, which means that they can be more easily finished to closer mating tolerances. The same stiffness in a large diameter tube would result in excessive material cost and greater bulk and weight in the final product.

It will also be seen that because the metering tubes 48 and 49 are separate from the main bore of the outer tube or piston cylinder 11 that the main bore of the piston cylinder 11 is simplified by not having a series of orifices machined in it. This main bore is smooth and uninterrupted and provides greater structural integrity as compared to the prior art shock absorbers. The piston 82 may have greater design flexibility. The bearings and seals on the piston 82 may be non-metallic, which is an advantage when the shock absorber must be used with hydraulic fluids having low lubricating qualities. The resulting simplified bearings and seals provide economy since they are also subject to less wear because they do not have to cross sharp edged orifices or holes on the main bore of the tube 11, and accordingly, they will last longer and need not be replaced as often.

The small diameter metering tubes 48 and 49, which are relatively rotatable upon each other to vary the metering orifice size, provide an optimum valving means since there are no large hydraulic forces tending to separate the edges of the metering orifices. The reduced diameter tube-on-tube metering means of the present invention also provides the advantage of reduced temperature sensitivity. In a hydraulic shock absorber, the pressure drop to absorb the energy is generated at the metering orifices. It is well known that a knife edge or a sharp edge orifice is relatively insensitive to oil viscosity changes as a result of temperature changes. It is relatively difficult to produce a sharp edged orifice in a narrow slot around a circumference of a large metering tube. However, with the reduced tube circumference of the metering tubes 48 and 49 as employed in the present invention, it is possible to provide the same orifice area by increasing the slot width. The ability to provide increased slot widths provides an orifice construction wherein the viscous pressure drop is substantially reduced as compared to larger diameter shock absorbers where large diameter metering tubes are employed. This means that the shock absorber of the present invention will operate as rapidly and efficiently when it is first started at the beginning of a work day when it is used on an assembly line as compared to when it has been running after a full day's use. The shock absorber of the present invention also may be used on an automated assembly line or the like to provide a constant time cycle, whereby its use will not upset the synchronization of such a line, regardless of the time of the day or period over which it has been used. It is well known that the largest practical number of orifices provides the greatest efficiency in a linear deceleration shock absorber. The shock absorber of the present invention permits the use of a large number of adjustable orifices without weakening the metering tubes, to provide optimum efficiency, and this is possible because the orifice circumference is reduced with the small diameter metering tubes 48 and 49, as compared to the prior art large metering tubes.

The small diameter metering tubes 48 and 49 with their close fitting tolerances hold leakage between the tubes to a minimum, and accordingly, the structure is adapted to provide a shock absorber which is capable of providing linear deceleration at extremely low speeds.

FIG. 5 illustrates a modified embodiment of the invention wherein the return spring is eliminated, and an outside pneumatic return force acting through an air-oil tank is used. The parts of the embodiment of FIG. 5 which correspond to the parts of the embodiment of FIGS. 1 through 4 have been marked with the same reference numerals followed by the small letter "a."

In the embodiment of FIG. 5, the accumulator cylinder 24 and sponge 26 have been eliminated. The port 39a is directly connected to a suitable fluid conduit 125 which is operatively connected to a suitable air-oil accumulator tank 126. The accumulator tank 126 may be any conventional air-oil tank which is half filled with oil in the lower end thereof and which is provided with air under pressure in the top end thereof. The numeral 124 designates an air line which is connected at one end to the accumulator tank 126 and which would be connected at the other end to a suitable source of pressurized air. It will be understood that the shock absorber illustrated in FIG. 5 functions in the same manner as the shock absorber illustrated in FIGS. 1 through 4, but that the return force would be provided by the air-oil pneumatic system illustrated.

FIG. 6 is a fragmentary illustration of a modified piston structure. The parts of the piston structure illustrated in FIG. 6 which are the same as the first embodiment of FIGS. 1 through 4 have been marked with the same reference numerals followed by the small letter "b." The only difference between the piston structure of FIG. 6 and that of FIG. 1 is that the sleeve bearing 83 and the piston ring 84 have been replaced by a single sleeve bearing 83b which may be made from any suitable material, including a non-metallic material. It will be seen that a shock absorber provided with a single dynamic seal as 83b and the two static seals 117 and 120 may be pressurized to very high return pressures, such as pressures obtained in hydraulic pumps or high pressure nitrogen accumulators. The shock absorber of the present invention is thus adapted to withstand larger than normal repositioning forces. The piston area of the return piston 82 is relatively large, and it is light in weight and rigid in construction, as compared to the piston rods used in prior art shock absorbers.

FIGS. 7 through 10 illustrate another outer fixed metering tube which may be used in a shock absorber of the present invention. The parts of the metering tube illustrated in FIGS. 7 through 10 which are the same as the metering tube 49 in the embodiment of FIGS. 1 through 4 have been marked with the same reference numerals followed by the small letter "c."

Figure 7:
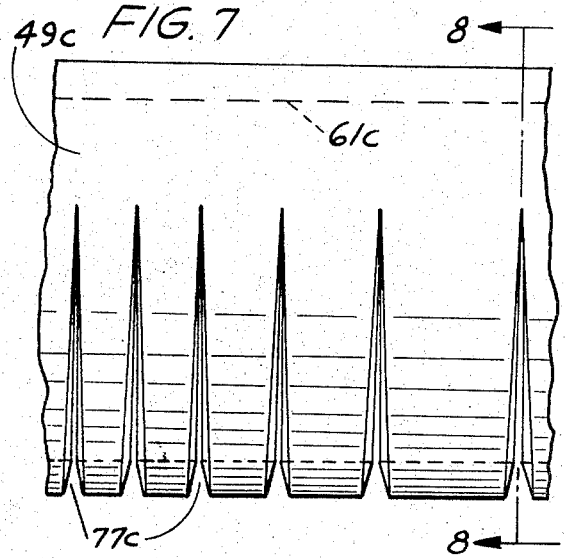
FIG. 7 is a fragmentary side elevational view of an outer fixed metering tube adapted to be used in shock absorbers of the present invention, and showing another type of sharp edged metering orifice.
Figure 8:
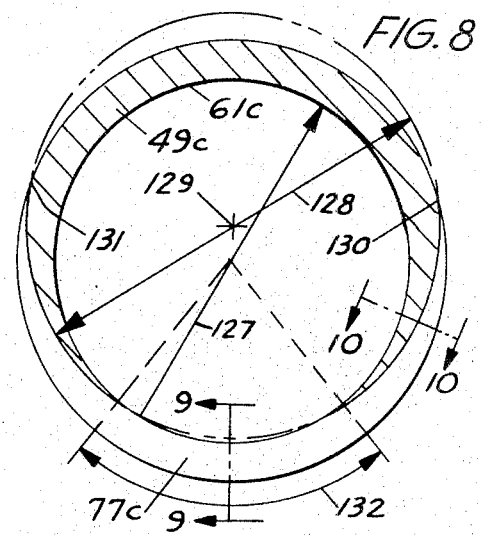
FIG. 8 is an elevational section view of the outer metering tube structure illustrated in FIG. 7, taken along the line 8—8 thereof, and looking in the direction of the arrows.
Figure 9:
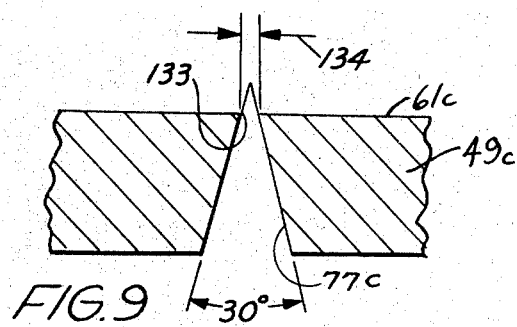
FIG. 9 is an enlarged, fragmentary, elevational section view of the structure illustrated in FIG. 8, taken along the line 9—9 thereof, and looking in the direction of the arrows.
Figure 10:
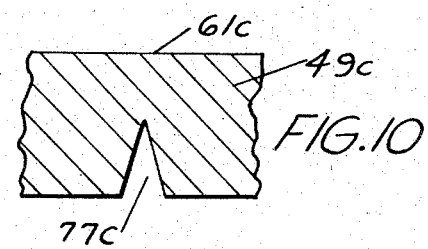
FIG. 10 is an enlarged, fragmentary section view of the structure illustrated in FIG. 8, taken along the line 10—10 thereof, and looking in the direction of the arrows.

As shown in FIGS. 7 and 9, the metering orifices 77c comprise tapered slots which extend through a 90° angle arc, as indicated by the numeral 132 in FIG. 8. The tapered slots 77c are formed by cutting a tapered groove in the outer surface of the tube 49c with a suitable cutting tool which is so positioned that it cuts through the inner surface of the tube 49c between two arcuate points which are 90° apart as indicated by the numeral 132. The numeral 127 in FIG. 8 designates the diameter of the tube 49c. The numeral 128 indicates the diameter of the cutting circle at which the tapered cutting tool would be stopped at its inward movement in cutting the orifices 77c so as to provide the proper 90° arc. The numeral 129 indicates the center point of the diameter line 128. The numerals 130 and 131 designate the points at which the cutting circle 128 emerges from the outer surface of the tube 49c. In FIG. 9, numeral 133 designates the sharp inner edge of the tapered slots which provides an extremely sharp edged metering orifice. The numeral 134 designates the width of the inner sharp edge 133 of the metering orifice, which would extend throughout the 90° arc. The width 134 would depend in each case on the desired deceleration characteristics and the size of the shock absorber. The fixed outer metering tube 49c functions in the same manner as the previously described metering tube 49, and it is adapted to function in the same manner with the previously described adjustable inner metering tube 48. It will be seen that the cross sectional area of the orifices 77c are truncated in cross section while the cross section of the orifices 77 are substantially rectangular.

Figure 11:
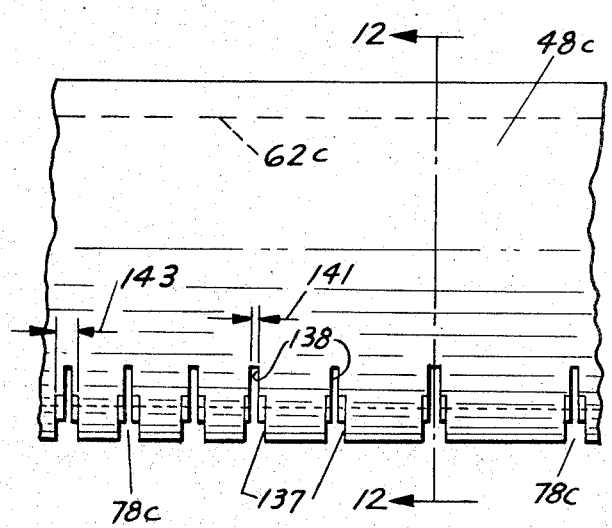
FIG. 11 is a fragmentary, side elevational view of an adjustable inner metering tube adapted to be used with the outer metering tube illustrated in FIG. 7.
Figure 12:
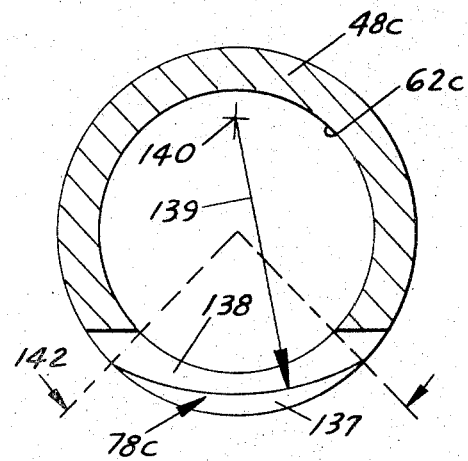
FIG. 12 is an elevational section view of the inner metering tube structure illustrated in FIG. 11, taken along the line 12—12 thereof, and looking in the direction of the arrows.

FIGS. 11 and 12 illustrate a second embodiment of an adjustable inner metering tube which may be employed in the shock absorber of the present invention. The parts of the inner metering tube illustrated in FIGS. 11 and 12 which are the same as the metering tube 48 of the embodiment of FIGS. 1 through 4 have been marked with the same reference numerals followed by the small letter "c." In the embodiment of FIGS. 11 and 12, the metering slot orifice 78c is formed in a stepped fashion with an outer slot portion 137 being formed to a first width, and the inner slot portion 138 being formed to a second and narrower width. The narrow width orifice portion 138 would be preferably formed by a flat milling cutter which would be passed through the periphery of the tube 48c, and through the inner periphery thereof, so as to form a slot having an arcuate length of 90°, as indicated by the numeral 142. The enlarged width outer orifice portion 137 would preferably be formed with a rotary milling cutter which would cut through the wall of the tube 48c in the path of the narrow slot 138 but on an arcuate path formed by the radius 139 which is shown as extending from a center point or radius point 140. It will be seen that the orifice 78c is provided with a sharp edge along the arcuate junction point between the enlarged orifice portion 137 and the narrow orifice portion 138. The relative widths of the orifice portions 137 and 138 are indicated by the numerals 143 and 141 respectively, in FIG. 11.

The inner adjustable metering tube 48c would function in the same manner as the inner metering tube 48. FIGS. 13 and 14 illustrate the rotatable mounting of the inner tube 48c in the aforedescribed outer metering tube 49c. However, it will be understood that the inner metering tube 48c could also be used with the outer metering tube 49 of FIG. 1.

FIGS. 15, 16 and 17 illustrate still another modified outer fixed metering tube, and the parts thereof which are the same as the outer metering tube 49 of FIG. 1 have been marked with the same reference numerals followed by the small letter "d." In the embodiment of FIGS. 15, 16 and 17, the metering orifice 77d comprises an outer, enlarged width slot portion 144 and an inner narrower width slot portion 145. The orifice portions 144 and 142 may be formed by any suitable means, as by a milling cutter which would pass through the inner wall of the tube 49d when making the narrow orifice portion 145 so as to provide an arcuate slot orifice opening extending through 90°. A second wider, or thicker, milling cutter as 146 would then be used to form the outer wider slot portion 144 which has its ends extended beyond the 90° narrow inner portion 145, as shown in FIG. 16.

FIG. 17 indicates the relative widths of the orifice portions 144 and 145 and they would be made in accordance with the flow capacity desired. However, it will be seen that the orifice structure of FIGS. 15 through 17 provides an extremely sharp edged orifice at the junction point between the enlarged portion 144 and the narrow portion 145. The outer fixed metering tube 49d functions in the same manner as the outer metering tube 49 of FIG. 1, and it is also adapted to function with the inner metering tube 48c.

FIG. 18 illustrates a modified inner metering tube provided with sharp edged orifices and with pressure relief grooves on each side of each orifice which limit the size of the force tending to separate the inner tube from an outer tube in the zone adjacent to the orifices.

FIGS. 19 through 25 illustrate the steps of one suitable method for forming the orifices of this embodiment together with the pressure relief grooves. The parts of the inner metering tube illustrated in FIGS. 18 through 25 which are the same as the inner metering tube 48 of the embodiment of FIG. 1 have been marked with the same reference numerals followed by the small letter $d'$.

In FIG. 18, the numeral 148 designates the final sharp edge orifice slots which are formed through the wall of the tube 48$d'$. The numerals 150 in FIG. 18 designate the tapered pressure relief grooves 150 which are formed on each side of each of the orifices 148. The final sharp edged orifices 148 may be formed in the following described manner.

Figure 19:
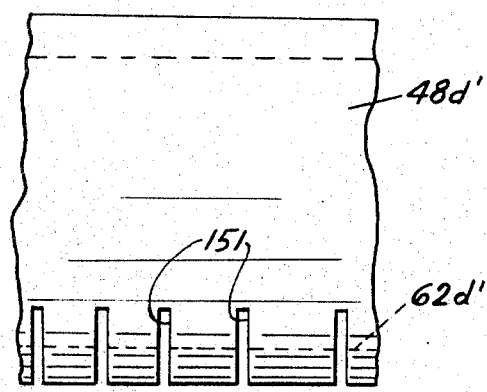
FIGS. 19 through 25 illustrate the sequence of steps employed in forming the sharp edged metering orifices employed in the adjustable inner metering tube of FIG. 18.
Figure 20:
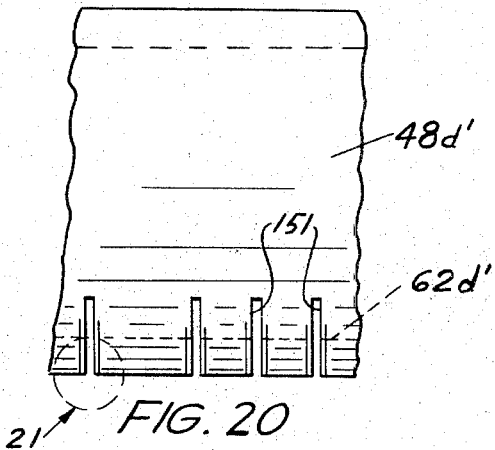
Figure 21:
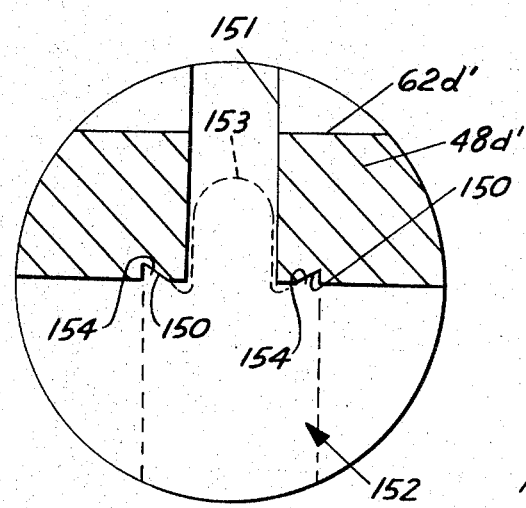
Figure 22:
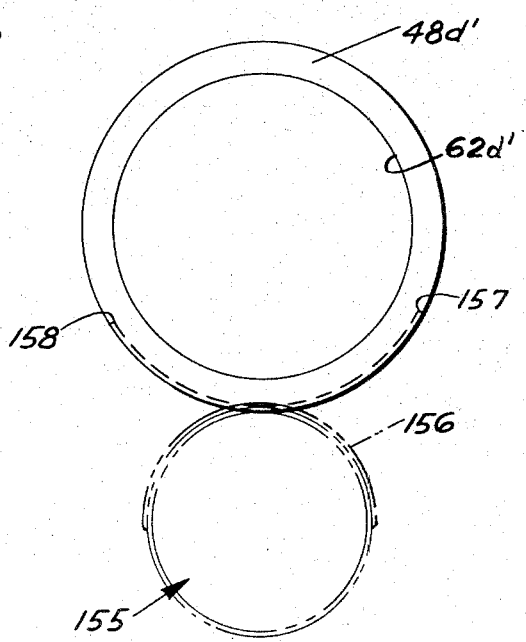
Figure 23:
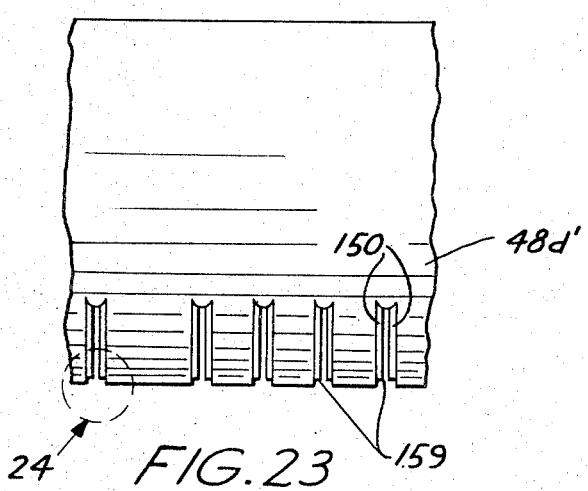
Figure 24:
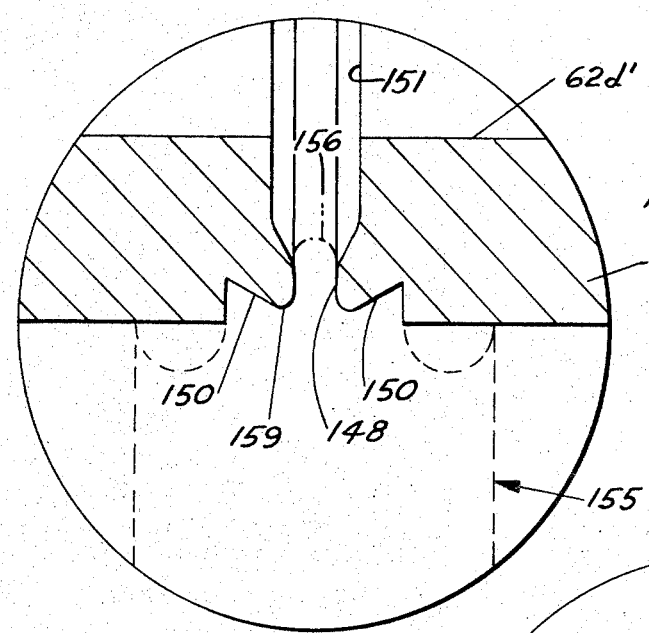
Figure 25:
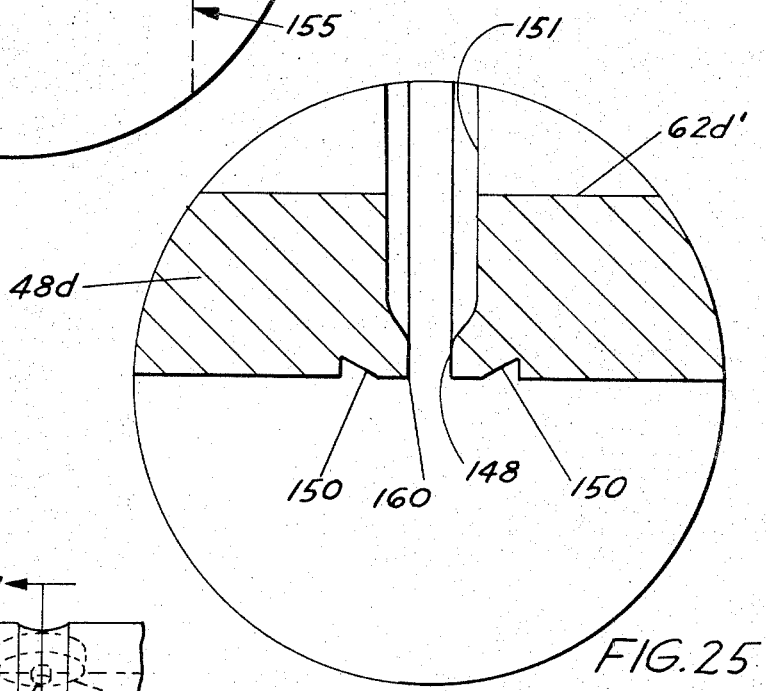

As shown in FIG. 19, a first slot 151 is cut through the wall of the tube 48$d'$ to the desired width and throughout the desired 90° arc. As shown in FIGS. 20 and 21 a cutting tool 152 is then used to form relief grooves 150, in the outer surface of the tube 48$d'$ to a first depth. The tool 152 has a rounded nose 153 and a pair of spaced side cutting edges 154 for cutting the grooves 150. A cold forming or swadging tool 155, as shown in FIG. 22, is next rolled throughout the length of the slot 151. As shown in FIGS. 22 and 24, the swadging or cold forming tool 155 is provided with a peripherally extended and rounded forming edge 156 which extends throughout one-half of the circumference of the tool. The tool edge 156, as shown in FIG. 24, is extended into the slot 151. The tool 155 is provided with a pair of tapered shoulders which extend into the grooves 151. It will be seen from FIG. 24 that the peripheral forming edge 156 is narrower in width than the original orifice slot 151, whereby when the swadging tool 155 is rolled and forced inwardly against the tube 48$d'$ the tool will extend the pressure relief grooves 150 inward and at the same time force the outer edges of the slot 151 over to provide a narrow outer slot 148 having rounded edges 159. The rolling and cold forming tool 155 is rolled between the points 157 and 158, as shown in FIG. 22, which are slightly beyond the arcuate ends of the original slot 151. The tube 48$d'$ is then subjected to a fine honing or grinding operation on its outer periphery so that its outer surface is ground down to the condition shown in FIG. 25, whereby the rounded slot edges 159 are ground off to provide a sharp orifice edge 160 for the outer orifice slot 148. The sharp edged slot 148 thus becomes the metering orifice and its inner portion 151 is an enlarged continuation of the slot. The inner metering tube 48$d'$ functions in the same manner as the previously described inner metering tubes and it is adapted to function with any of the aforedescribed outer metering tubes.

Figure 26:
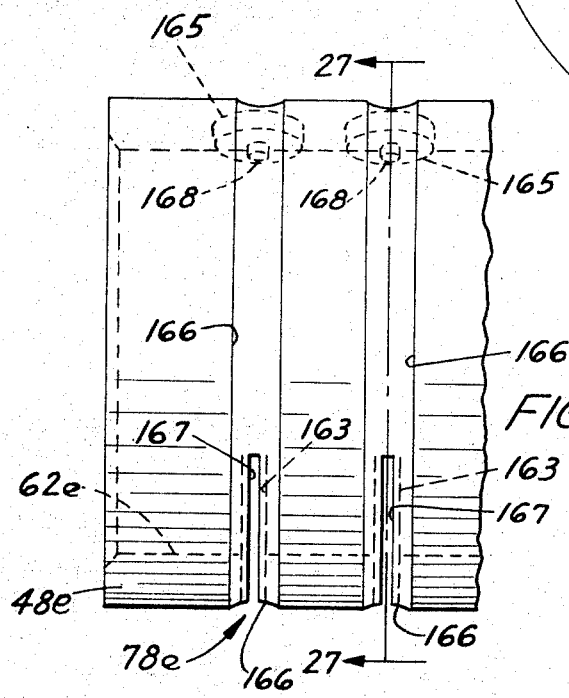
FIG. 26 is a fragmentary side elevational view of an adjustable inner metering tube adapted to be used with the outer metering tube illustrated in FIG. 15.
Figure 27:
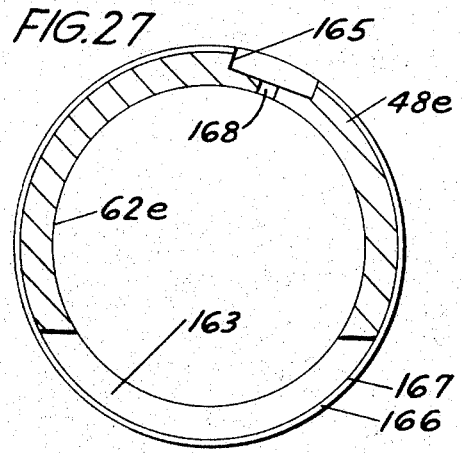
FIG. 27 is an elevational section view of the inner metering tube structure illustrated in FIG. 26, taken along the line 27—27 thereof, and looking in the direction of the arrows.
Figure 28:
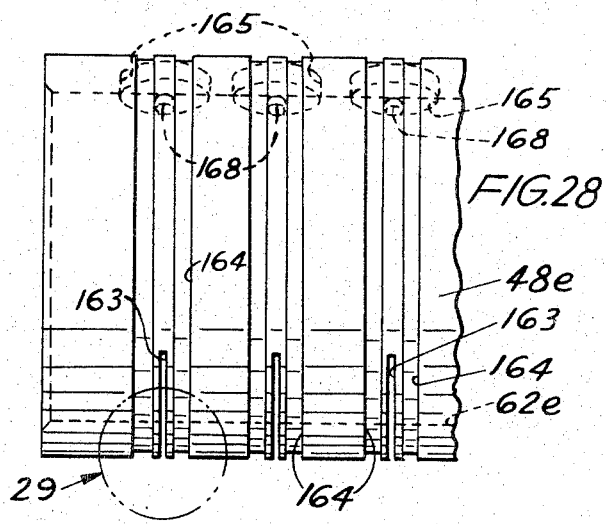
FIGS. 28 through 30 illustrate some of the sequence of steps employed in forming the sharp edge metering orifices employed in the adjustable inner metering tube of FIG. 26.
Figure 29:
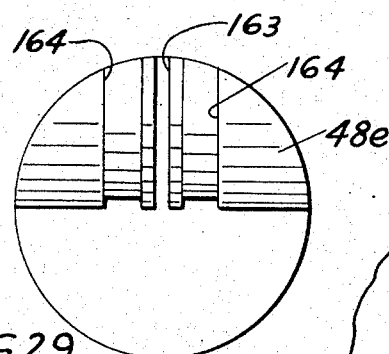
Figure 30:
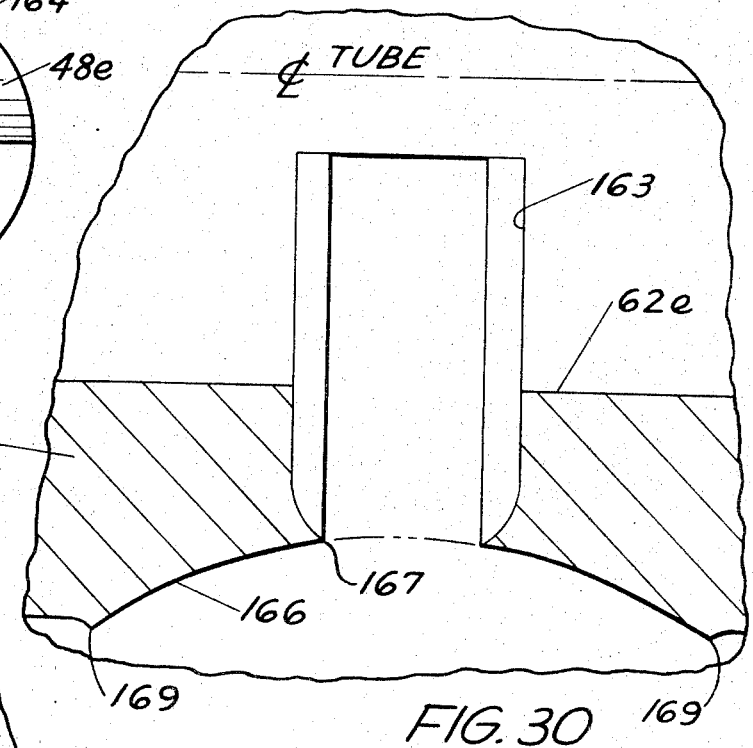

FIGS. 26 through 30 illustrate another modified adjustable inner metering tube adapted to be used with the outer metering tubes of the shock absorber of the present invention. The parts of the embodiment of FIGS. 26 through 30 which are the same as the embodiment of FIG. 1 have been marked with the same reference numerals followed by the small letter "$e$." The sharp edged metering orifices of this embodiment are indicated by the numeral 167 in FIGS. 26 and 27. FIGS. 28, 29 and 30 indicate the steps that may be followed in forming the sharp edged orifices 167 which extend throughout a 90° arc. As shown in FIGS. 28 and 29, a first orifice 163 is cut as a slot through the periphery of the wall of the tube 48$e$. The orifice slot 163 is cut through the arc of 90° and to the desired width. A pair of grooves are then cut around the entire periphery of the tube 48$e$ on opposite sides of each of the orifice slots 163 and to a desired depth and width. As shown in FIG. 29 the grooves 164 are cut to a width of about three times the width of the orifice slots 163. A cold forming round edged tool is then rolled against the outer periphery of the grooves 164 and the slots 163 so as to cold form the tube peripheral area making a sharp edged narrow orifice slot 167 that extends throughout the 90° arc, and at the same time flatten off the material extended between the grooves 164 and form a concave pressure relief groove 166 that extends around the periphery of the tube 48$e$.

The cold rolling and forming operation leaves a pair of radially outward extended circumferential projections or lips 169 which are removed by a suitable honing or grinding operation so as to provide the finished smooth surfaced configuration illustrated in FIGS. 26 and 27. An enlarged bleed hole 165 is formed in the outer surface of the tube 48$e$ at a position diametrically opposite to each of the orifice slots 167 and it communicates with the interior of the tube 48$e$ through a hole 168. The leakage fluid under pressure which passes around and through the grooves 166 and into the holes 165 and through the holes 168 provides a balancing effect on the inner tube 48$e$ relative to its position inside of a mating fixed outer metering tube. The inner metering tube 48$e$ functions in the same manner as the other aforedescribed inner metering tubes, and it also functions with any of the aforedescribed outer fixed metering tubes.

Figure 31:
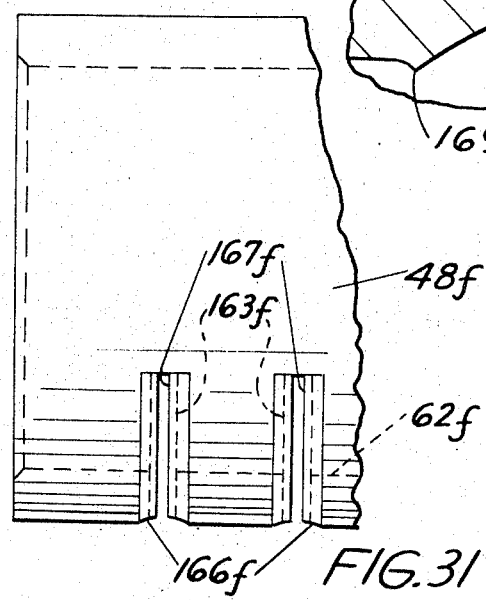
FIG. 31 is a fragmentary, side elevational view of still another inner adjustable metering tube adapted to be used with the outer metering tube illustrated in FIG. 15.

FIG. 31 illustrates still another modified adjustable inner metering tube in which the parts corresponding to the parts of the metering tube 48 of FIG. 1 have been marked with the same reference numerals followed by the small letter "$f$." The inner metering tube of FIG. 31 is constructed the same as the inner metering tube of FIGS. 26 through 30, with the exception that the pressure relief grooves 166f are only extended throughout the length of the orifice slots 167f, and the holes 165 and 168 are eliminated. The inner metering tube 48f functions in the same manner as the aforedescribed inner metering tube 48.

While it will be apparent that the preferred embodiments of the invention herein disclosed are well calculated to fulfill the objects above stated, it will be appreciated that the invention is susceptible to modification, variation and change.

What is claimed is:

1. In an adjustable hydraulic shock absorber, the combination comprising:
   a. a piston cylinder filled with fluid and having one end enclosed by a cylinder head and having port means at the other end thereof;
   b. a fluid accumulator means connected to said port means for receiving fluid under pressure from said port means during a shock absorbing operation and for returning fluid to the port means after a shock absorbing operation;
   c. a fluid metering tube means filled with fluid and supported axially in said piston cylinder and provided with a plurality of fluid metering orifices communicating the interior of said metering tube means with said piston cylinder and providing a controlled flow of fluid from said metering tube means during a shock absorbing operation;
   d. a piston means slidably mounted in said piston cylinder and being telescopically mounted over said metering tube means for receiving a shock and for absorbing said shock during an inward movement from an initial position into the piston cylinder, and which is adapted to be moved outward to said initial position after the shock absorbing inward movement;
   e. adjustment means operatively connected to said metering tube means for adjusting the effective cross sectional area of said metering orifices to adjust the flow of metered fluid through said metering tube means to provide a controlled shock absorbing inward movement of said piston means;
   f. a first fluid passage means connecting the interior of said metering tube means to said port means for passage therethrough of fluid forced from the piston chamber and into said metering tube means during an inward shock absorbing movement of said piston means, and, a second fluid passage means connecting said port means to said piston cylinder during an outward movement of said piston means to said initial position for transferring fluid from said accumulator means to said piston cylinder;
   g. said fluid metering tube means comprising a fixed metering tube having a plurality of metering orifices, and an adjustable metering tube having a plurality of metering orifices adapted to be aligned with said metering orifices in said fixed metering tube and being connected to said adjustment means;
   h. said piston means including a tubular piston rod for telescopically receiving the inner end of said fluid metering tube means;
   i. said fixed metering tube having the outer end supported by said cylinder head;
   j. said adjustable metering tube being rotatably mounted within said fixed metering tube and being rotatably supported by said cylinder head and being connected to said adjustment means;
   k. said first fluid passage means including a plurality of ports formed through the inner end of said fixed metering tube which communicate with the interior of the metering tube means, and a first plurality of communicating passages through said piston means for connecting the interior of said metering tube means with said first named port means during an inward movement of said piston means; and
   l. said second fluid passage means including a second plurality of passages formed through said piston means and connected to said first plurality of passages through said piston means and communicating the piston cylinder with said port means, and each of said second plurality of passages through said piston means having a ball check valve operatively mounted therein for closing said second plurality of passages during a shock absorbing inward movement of said piston means and for opening said second plurality of passages during an outward movement of said piston means.

2. An adjustable shock absorber as defined in claim 1, wherein:
   a. each of the metering orifice slots in said adjustable metering tube includes a first width outer portion and a second narrower width inner portion.

3. An adjustable shock absorber as defined in claim 1, wherein:
   a. said fluid accumulator means is a separately formed accumulator means.

4. An adjustable shock absorber as defined in claim 1, including:
   a. a return spring means mounted in said tubular piston rod.

5. An adjustable shock absorber as defined in claim 1, including:
   a. a return spring means operatively mounted in said shock absorber for returning the piston means to the initial position after a shock absorbing inward movement.

6. An adjustable shock absorber as defined in claim 1, including:
   a. means for mounting the shock absorber in an operative position.

7. An adjustable shock absorber as defined in claim 1, wherein:
   a. said piston means is provided with an internal sleeve bearing and a piston ring for slidably mounting the piston means on said metering tube means.

8. An adjustable shock absorber as defined in claim 1, wherein:
   a. said piston means is provided with an internal non-metallic sleeve bearing for slidably mounting the piston means on said metering tube means.

9. An adjustable shock absorber as defined in claim 1, wherein:
   a. said plurality of fluid metering orifices in said fixed and adjustable metering tube are longitudinally spaced apart in an exponential manner to provide a controlled linear deceleration.

10. An adjustable shock absorber as defined in claim 1, wherein:
   a. the metering orifices in said fixed metering tube each comprises a peripheral slot cut through the wall thereof and extending throughout a predetermined arcuate length; and,
   b. the metering orifices in said adjustable metering tube each comprises a peripheral slot cut through the wall thereof and extending throughout said predetermined arcuate length and being of a width larger than the peripheral slots cut through the fixed metering tube.

11. An adjustable shock absorber as defined in claim 10, wherein:
   a. each of the metering orifice slots in said fixed metering tube includes a first width outer portion and a second narrower width inner portion.

12. An adjustable shock absorber as defined in claim 10, wherein:
   a. each of said metering orifice slots in said fixed metering tube comprises an inwardly tapered peripheral slot.

13. An adjustable shock absorber as defined in claim 12, wherein:
   a. each of the metering orifice slots in said adjustable metering tube is provided with a central reduced width portion for alignment with the reduced inner end of a metering orifice tapered slot in the fixed metering tube.

14. An adjustable shock absorber as defined in claim 10, wherein:
   a. each of the metering orifice slots in said adjustable metering tube is provided with a fluid pressure relief groove on each side thereof.

15. An adjustable shock absorber as defined in claim 14, wherein:
   a. each of said metering orifice slots in said adjustable metering tube is formed by first cutting a peripheral slot through the wall of the adjustable metering tube, cutting a tapered groove along each side of said last named slot, rolling over the edges longitudinally of the tube of said last named slot, and grinding the outer surface of the adjustable metering tube to form a sharp edged metering orifice slot.

16. An adjustable shock absorber as defined in claim 14, wherein:
   a. said pressure relief grooves extend completely around the adjustable metering tube.

17. An adjustable shock absorber as defined in claim 16, wherein:
   a. said adjustable metering tube is provided with pressure relief openings communicating with said pressure relief grooves.

18. An adjustable shock absorber as defined in claim 14, wherein:
   a. each of said metering orifice slots in said adjustable metering tube is formed by first cutting a peripheral slot through the wall of the adjustable metering tube, cutting a rectangular cross section groove along each side of said last named slot, rolling over the edges, longitudinally of the tube of said last named slot and grooves to form a concave groove with a sharp edged metering slot disposed in the deepest part of the concave groove, and grinding the outer surface of the adjustable metering tube.

19. An adjustable shock absorber as defined in claim 18, wherein:
   a. the rectangular cross section groove along each side of said slot is extended around the entire circumference of the adjustable metering tube so as to provide a concave groove extending completely around the adjustable metering tube.

20. An adjustable shock absorber as defined in claim 1, wherein:
   a. said fluid accumulator means comprises a cylinder concentrically mounted around said piston cylinder and provided with an accumulator sponge means.

21. An adjustable shock absorber as defined in claim 20, wherein:
   a. the fluid in said piston cylinder, fluid metering tube means and fluid accumulator means is under pressure.

22. An adjustable shock absorber as defined in claim 1, wherein:
   a. said adjustment means includes a retainer which is attached to said adjustable metering tube and which is rotatably mounted in said cylinder head.

23. An adjustable shock absorber as defined in claim 22, wherein:
   a. said adjustment means includes an adjusting pin secured to said retainer for rotatably adjusting said retainer and adjustable metering tube in accordance with an arcuate adjustment scale on the outer periphery of said cylinder head which is marked with adjustment indicia.

* * * * *